United States Patent Office 3,677,994
Patented July 18, 1972

3,677,994
CEMENT-FILLED POLY(ARYLENE SULFIDE) RESINS
Harold V. Wood and Terry D. Brown, Bartlesville, Okla., assignors to Phillips Petroleum Company
No Drawing. Filed Apr. 28, 1970, Ser. No. 32,737
Int. Cl. C08g 51/04
U.S. Cl. 260—37 R    4 Claims

ABSTRACT OF THE DISCLOSURE

Moldable compositions which are suitable for forming into various finished products are prepared by adding up to 50 weight percent based on the total weight of the composition of a hydraulic cement to a poly(arylene sulfide) resin. In a preferred method of preparing the moldable compositions a slurry of a poly(arylene sulfide) resin and a hydraulic cement are formed, the liquid is allowed to evaporate, and the resulting granular mixture is heated, cured and then subjected to molding, yielding molded articles having good values in modulus, tensile and impact.

---

This invention relates to the production of novel filled poly(arylene sulfide) compositions. In accordance with another aspect, this invention relates to the addition of hydraulic cement to poly(arylene sulfide) resins to form moldable compositions which have valuable properties with respect to modulus, tensile and impact upon being molded into an article. In accordance with a further aspect, this invention relates to the formation of moldable compositions comprising forming a mixture of particulate poly(arylene sulfide) resin and a hydraulic cement, heat treating the mixture thus formed to cure the polymer, and then molding the cured composition. In accordance with a further aspect, the moldable composition is first mixed together as a slurry, followed by evaporation of the liquid carrier prior to heating to effect cure, and subjecting to pressure to mold.

Arylene sulfide polymers are ideally suited for a number of commercial applications, as well as formation into molded articles, because of the high temperature stability of such polymers and their ability to withstand chemical attack. In certain applications concerning the use of arylene sulfide resins, it is desirable to have a product that has good impact, tensile and flexural modulus values.

We have now found that the addition of hydraulic cement to poly(arylene sulfide) resins materially increases the flexural modulus, tensile and impact properties for the polymer.

It is an object of our invention to provide an improved moldable composition from an arylene sulfide polymer.

Another object of this invention is to provide an improved method for forming moldable compositions comprising arylene sulfide polymers.

Another object of this invention is to provide a novel poly(arylene sulfide) filled composition.

Other objects, advantages, and features of our invention will be apparent to those skilled in the art from consideration of the following disclosure and the appended claims.

The term "arylene sulfide polymer" as used in this specification is intended to include polymers of the type which are prepared as described in U.S. Pat. 3,354,129, issue Nov. 21, 1967, to Edmonds and Hill. As disclosed in this patent, these polymers can be prepared by reacting a poly-halo-substituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in the coating procedure of this invention, because of their high thermal stability and availability of the materials from which they are prepared, are those polymers having the repeating unit —R—S— where R is phenylene, biphenylene, naphthylene, biphenylene ether or a lower alkyl-substituted derivative thereof. By "lower alkyl" is meant alkyl groups having 1 to 6 carbon atoms such as methyl, propyl, isobutyl, n-hexyl, and the like. The preparation of such polymers is quite well disclosed in the above patent of Edmonds et al.

The polymers which are used for coatings in this invention are preferably those which have melting temperatures above about 400° F. These arylene sulfide polymers can have a melting temperature anywhere in the range from 400 to 900° F. Polymers of phenylene sulfide normally have melting temperatures in the range from about 550 to 900° F. The preferred polymers have an inherent viscosity in chloronaphthalene at 206° C. of at least 0.1, more preferably between 0.1 and 0.3 and ideally between 0.13 and 0.23, as such polymers have been found to form very adherent, uniform coatings which are superior for the uses mentioned above.

The hydraulic cements which are admixed with the arylene sulfide polymers in preparing the moldable compositions include any inorganic material that hardens when combined with water such as, for example, plaster of Paris, portland cement, and sorel cement, as well as masonry cement. Representative examples of suitable hydraulic cements that can be used according to the invention are described by Bogue in "The Chemistry of Portland Cement," 2nd edition, Reinhold (1955), pp. 23–36. The hydraulic cements ordinarily contain calcium and aluminum. The cement can be used with or without aggregate.

The amount of cement added to the poly(arylene sulfide) resins will not ordinarily exceed 50 weight percent cement filler, ordinarily in the range 5 to 50 weight percent.

The particle size of the polymer can vary considerably and the most desirable particle size for a particular application can be easily determined in a relatively few trials. This can vary from the finest powder available up to about 10,000 microns in particle size. Good results can be obtained with the polymer in a particle size of about 1 to about 100 microns although the invention can be satisfactorily practiced with polymers of particle size outside this range. The particulate polymer can be employed as produced following formation of the polymer such as in the manner above described or the polymer can be reduced to the required particulate form if necessary prior to mixing with the cement. The polymer can be reduced to a desired particle size by any means known to the art such as grinding, ball milling and the like.

The poly(arylene sulfide) resin and hydraulic cement can either be dry mixed or mixed as a slurry. Volatilizable liquids that can be used in formation of the slurries are substantially non-reactive with the other materials of the composition and which are volatilizable preferably at ambient conditions. Examples of suitable liquids are water, ethanol, methanol, 2-propanol, hexane, ethylene glycol, acetone, xylene, tetrahydrofuran, tetrahydropyran, 4-chlorotetrahydropyran, and the like, as well as mixtures thereof.

It is presently preferred when using a liquid for blending the polymer and the cement to use acetone and/or water.

It is often preferred to dry mix the powdered polymer and the powdered cement. However, if a liquid is used for formation of a slurry, the slurry is allowed to dry by evaporation of the liquid prior to subjection of the cement and polymer to heat. The drying can be facilitated by reduced pressure if desired.

Prior to molding of the mixture of poly(arylene sulfide) resin and cement, it is generally preferred to subject the mixture to heat to effect cure. However, curing is not necessary, but is recommended because it generally toughens the polymer. The curing is carried out by heating the polymer together with cement filler either above or below the melting point of the polymer for a period of time sufficient to improve its properties. Generally this is done at 500°–900° F. for 5 minutes, 24 hours, or more.

Following preparation of the poly(arylene sulfide) resin-cement mixture, either by way of dry mixing or by way of a slurry with or without subsequent heat to effect cure, the mixture is subjected to molding to form the final product. The mixture of poly(arylene sulfide) and cement can be injection molded or compression molded, or any other type of molding can be used if desired.

It is often preferred to slake the cement; therefore, the mixture of poly(arylene sulfide) resin and cement is first wetted and then dried before curing and/or molding.

The resulting molded compositions can be machined by conventional methods into any desired form. Such articles are particularly valuable as bearings, pump vanes, valve parts, and the like.

EXAMPLE I

Poly(phenylene sulfide) was filled with two types of cement: portland cement (Type 1) and a portland cement-containing masonry cement were used.

The poly(phenylene sulfide) was prepared according to the method of U.S. 3,354,129. Thus, 40.8 lbs. of 62% flake sodium sulfide was dehydrated and charged into a reactor together with 128 lbs. of N-methylpyrrolidone and 49.1 lbs. of para-dichlorobenzene. This mixture was allowed to react for about 5 hours at an average reaction temperature of about 480° F. The reaction mixture contained about 3 mole percent excess of the para-dichlorobenzene. After this reaction period, the reactor contents were transferred to another vessel and the solvent removed by vacuum distillation. Water was added to form a slurry with the powdered product and the slurry was filtered and further washed with water to remove inorganic salts. The polymer had an inherent viscosity (in chloronaphthalene at 206° C.) of about 0.15–0.16.

The dried powdered polymer, having an average particle size in the range of from about 1 to about 100 microns, was then mixed with the cement filler. A 100-gram quantity of the mixture of cement and filler was then blended in a Waring Blendor together with 75 ml. of water and 75 ml. of acetone. The resulting slurry was allowed to evaporate to dryness overnight and the mixture was then cured for 1 hour at 700° F. in a forced draft oven. Following the curing, the polymer was injection molded to form specimens for physical testing. The results of the physical tests are shown in the following table. For purposes of comparison, a portion of the poly(phenylene sulfide) polymer was subjected to the same sequence of operations, including the curing, but was not blended with a filler. The results of the tests of this unfilled polymer are also shown in the table.

TABLE I

| Run | Filler, wt. percent | Flexural [1] modulus ×10[3] | Tensile,[2] p.s.i. | Elongation, percent [2] | Izod impact [3] |
|---|---|---|---|---|---|
| 1 | None | 468 | 1,780 | 1 | 0.90 |
| 2 | Cement,[4] 20% | 701 | 2,410 | 1 | 0.82 |
| 3 | Cement,[4] 30% | 795 | 4,080 | 2 | 1.54 |
| 4 | Cement,[4] 40% | 945 | 9,200 | 2 | 1.67 |
| 5 | Cement,[5] 20% | 669 | 2,610 | 1 | 1.06 |
| 6 | Cement,[5] 30% | 757 | 2,460 | 1 | 1.15 |
| 7 | Cement,[5] 40% | 930 | 7,390 | 1 | 1.96 |

[1] ASTM D 747–58T.
[2] ASTM D 638–60T.
[3] ASTM D 256–56 (unnotched, 75° F.).
[4] Portland cement Type I.
[5] Masonry cement.

The data in the table above show that the cement filler materials are compatible with the poly(phenylene sulfide) polymer as evidenced by the fact that much improved properties are obtained, particularly in flexural modulus and tensile strength. In the higher filler coatings, the values for the impact test are particularly improved.

Equally improved results were obtained when the cement was merely dry mixed with the powdered polymer or slurried with the polymer with the aid of a convenient non-aqueous liquid such as acetone.

We claim:

1. A process for the formation of a molded thermoplastic article having good values of modulus, tensile and impact from poly(arylene sulfide) resins which comprises:
   (a) forming a mixture of particulate arylene sulfide polymer and a hydraulic cement containing 5 to 50 weight percent cement, based on the total composition,
   (b) heating said mixture at an elevated temperature for a period of time sufficient to cure the mixture and toughens said polymer and form a mixture having thermoplastic characteristics, and
   (c) molding said cured mixture of poly(arylene sulfide) and cement, by heating said mixture above the melting point of said poly(arylene sulfide) and applying sufficient pressure to form said cured mixture into a molded thermoplastic product having good flexural modulus, tensile and impact properties.

2. A method according to claim 1 wherein the mixture of poly(arylene sulfide) and cement obtained in step (a) is a slurry of the polymer and cement and the slurry is allowed to dry to a granular mixture of polymer and cement prior to heating to a temperature in the range 500–900° F. for a finite period of time sufficient to effect cure and toughen said polymer.

3. A method according to claim 1 wherein said mixture is heated to a temperature in the range 500–900° F. for a period of time sufficient to effect cure and toughen said polymer, said cured product is injection molded, said polymer is a poly(phenylene sulfide) and the cement is a masonry cement, and the amount of cement present is in the range 5–50 weight percent.

4. A method according to claim 1 wherein said mixture is heated to a temperature in the range 500–900° F. for a period of time sufficient to effect cure and toughen said polymer, said cured product is injection molded, said polymer is a poly(phenylene sulfide) and said cement is portland cement, and the amount of cement present is in the range 5–50 weight percent.

References Cited

UNITED STATES PATENTS

| 3,030,664 | 4/1962 | Wijard | 106—90 XR |
| 3,240,736 | 3/1966 | Beckwith | 106—90 XR |
| 3,354,129 | 11/1967 | Edmonds et al. | 260—37 R XR |
| 2,311,233 | 2/1943 | Jaenicke et al. | 260—29.6 S XR |
| 3,487,038 | 12/1969 | Toy et al. | 260—29.6 S XR |

MORRIS LIEBMAN, Primary Examiner

S. M. PERSON, Assistant Examiner

U.S. Cl. X.R.

260—29.6 S